Feb. 24, 1931.   J. F. REBUCK   1,794,321
LOADING DEVICE
Filed Sept. 13, 1927   2 Sheets-Sheet 2
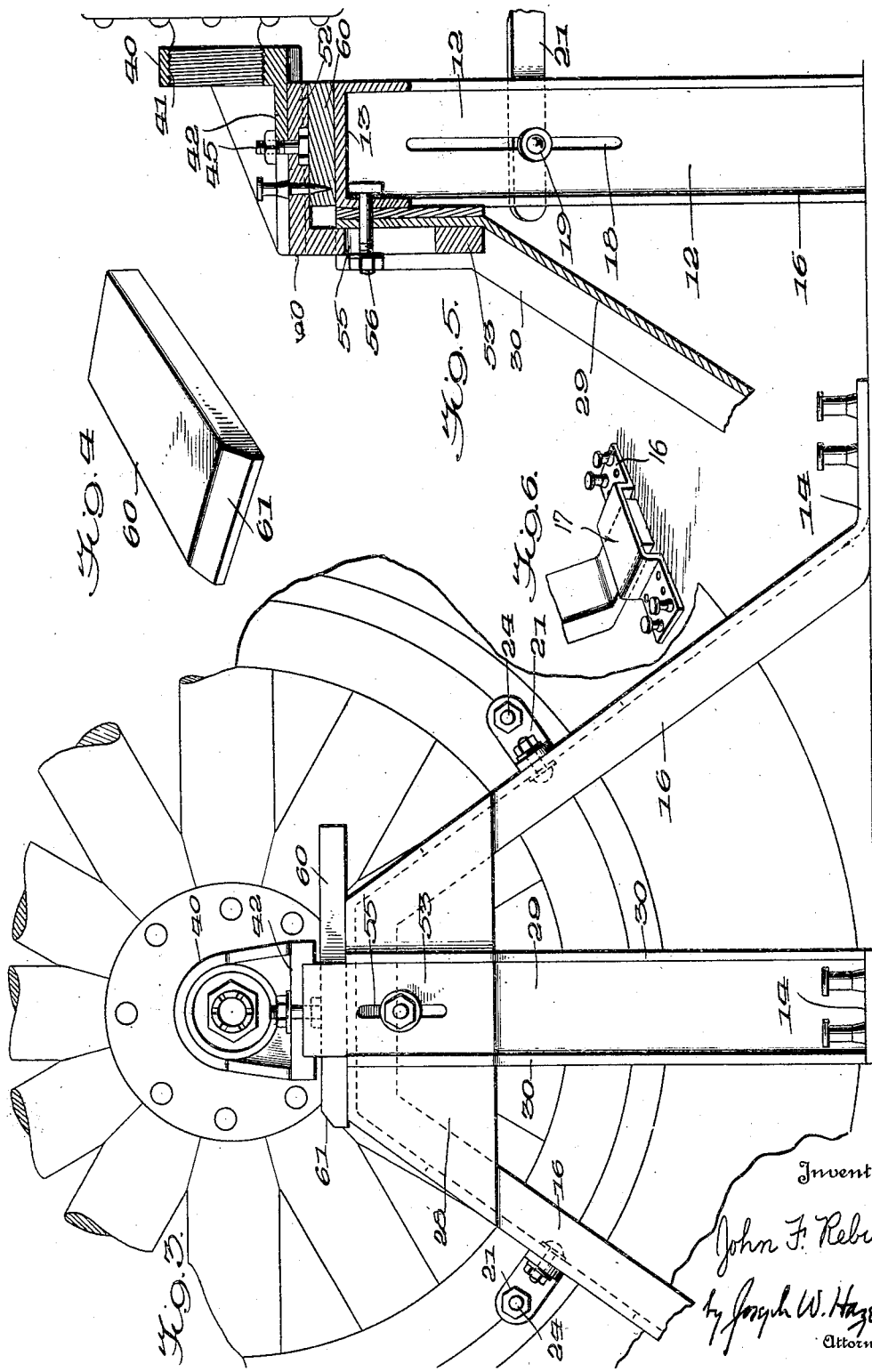
Inventor
John F. Rebuck
by Joseph W. Hazell
Attorney Patented Feb. 24, 1931

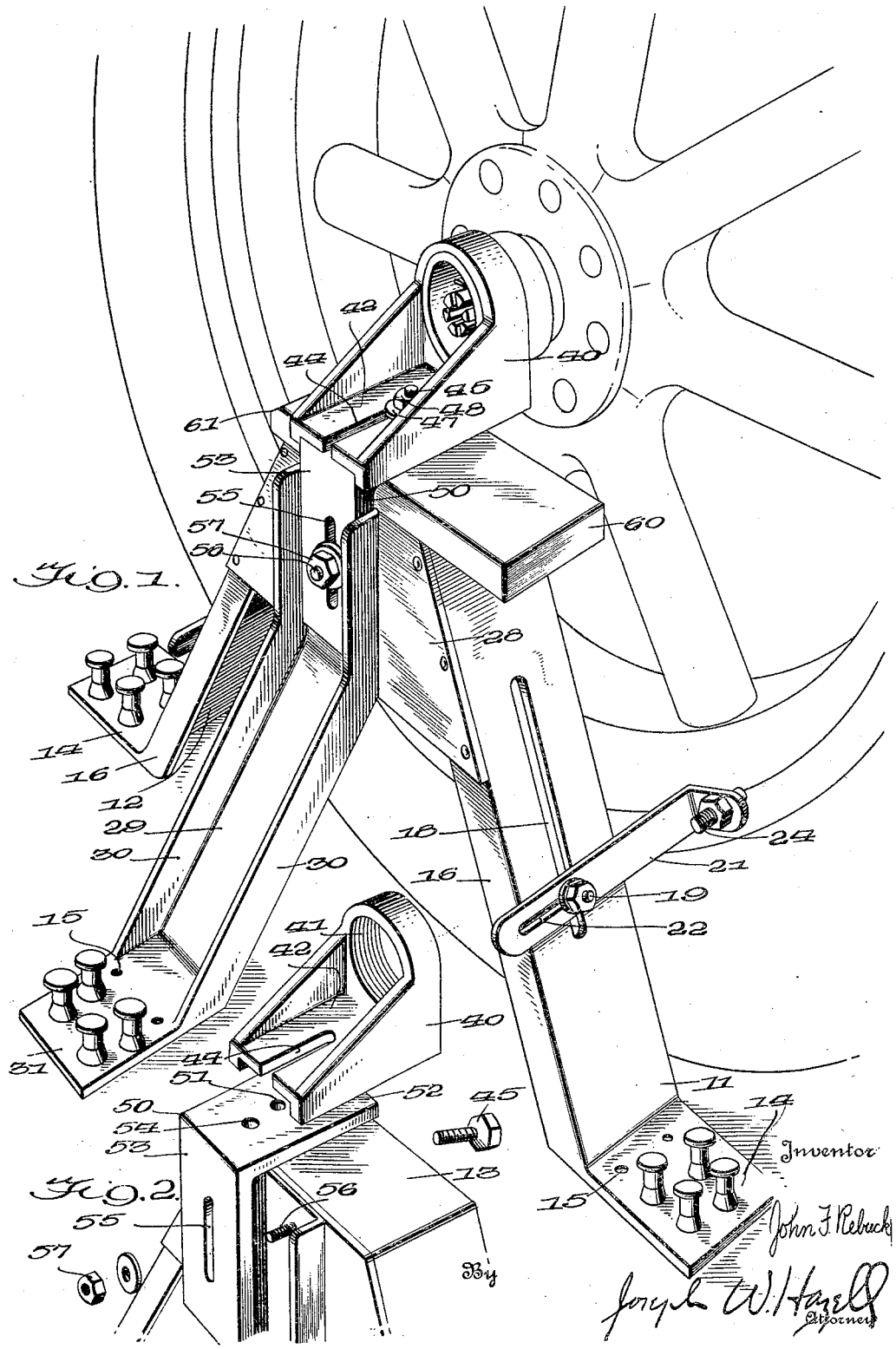

1,794,321

UNITED STATES PATENT OFFICE

JOHN FRANK REBUCK, OF WINTHROP, MASSACHUSETTS

LOADING DEVICE

Application filed September 13, 1927. Serial No. 219,314.

The present invention relates to devices for securing automobiles in freight cars, and more particularly to a loading buck for securing each wheel of the automobile to the body of the freight car.

An object of the invention is to provide a device of this type which can be used optionally to support all or only a part of the weight of the automobile, or can be used merely as a securing brace, without carrying any of the weight of the automobile.

Another object of the invention is to provide a device for this purpose which includes means for preventing the spreading of the automobile wheels under shocks received in shipment.

A further object of the invention is to provide such a device which may hold the automobile substantially rigidly, but which may include shock absorbing means to lessen the effect of jars and jolts received by the automobile as a result of starting, stopping, coupling and uncoupling the freight cars in which automobiles are shipped.

A still further object is to provide a device of the kind stated by means of which the time required to load an automobile is very materially reduced, and the unloading time similarly decreased.

Still another object of the invention is to provide a loading device, having the foregoing advantages, which can be used repeatedly, instead of being used once and then thrown away; which, when the automobile is unloaded, leaves no nails to be removed from the floor of the freight car; which can be secured tightly to the freight car floor in spite of cracks or defective flooring therein; which can be used either for floor loading or for half decking or for double or full decking; which protects the automobile from damage in shipment; and which is not only more efficient but also more economical than other devices.

Other objects and advantages of the invention will appear from the following description, taken in connection with the accompanying drawings, which illustrate, by way of example, a preferred embodiment of the invention, but which are not to be taken as a definition of the limits thereof, reference being had to the appended claims for that purpose.

In the drawings:

Fig. 1 is a prespective view showing an automobile wheel and a preferred embodiment of the present invention securing it to a floor, such as a freight car floor;

Fig. 2 is a fragmentary detached perspective view showing the separated parts at the top of the loading buck;

Fig. 3 is a side elevation, partly broken away, of the structure of Fig. 1;

Fig. 4 is a perspective view of a preferred form of removable shock absorbing and load carrying member;

Fig. 5 is a transverse sectional elevation, partly broken away, of the loading buck of Fig. 2;

Fig. 6 is a fragmentary perspective view, on a reduced scale, showing a form of means for securing the loading device to a floor.

The invention provides means for supporting, wholly or partially, or for receiving and bracing without supporting, the hub of each wheel of an automobile. The preferred form of means herein illustrated for this purpose comprises a metal brace, herein shown as being in the form of a tripod, although other suitable means may be used within the scope of the invention as defined by the accompanying claims.

Referring in detail to the accompanying drawings, the bracing means here shown by way of example includes a tripod having two of its legs 11 and 12 formed of a single strip of metal, bent to form the flat top portion 13 and an end flange or foot 14 at the base of each leg. Each foot or end flange 14 is preferably provided with a plurality of spaced apart nail or screw holes 15, preferably drilled at a small angle, and sloping toward the center of the brace from top to bottom, and, in practice, the number of these nail or screw holes provided is in excess of the number required to secure the brace to a freight car floor. This allows the desired number of securing nails or screws to be driven even though part of each foot 14 may be over a crack or defect in the floor. Also, the nails used are preferably, and as shown in the drawings, double head nails, which are easily gripped for removal, and all of which must be removed with the brace, thereby insuring that there will be no nails left in the box car floor to be removed by hand labor after the automobile is unloaded.

In Fig. 6 is shown a modified form of means for securing the feet 14 to the floor, and in this figure floor plates 16 having raised portions 17 may be used over the foot of each leg to secure it to the floor, and the securing nails or screws may pass through each end of each floor plate, thus allowing a limited movement on the floor of the loading device as a whole.

Each of the legs 11 and 12 is preferably provided with a depending strengthening flange 16 along each side edge, and each of the legs 11 and 12 is preferably longitudinally slotted, as at 18, for the reception of the shank of an adjustable side brace bolt 19. A bolt 19 may be provided for each of the legs 11 and 12, or for only one of said legs; and a rim bolt bracing arm 21 may be secured by a bolt 19 to each of the legs 11 and 12 or to only one of said legs.

The rim bolt bracing arm 21 is the preferred form of means included in the invention for bracing the automobile wheel at a point away from its hub. The arm 21 may be slotted as at 22, for the reception of the bolt 19, and may be bent at right angles at its outer end and drilled or punched for the reception of a rim bolt 24 on the automobile wheel, as shown in Fig. 1. The bracing of the wheel in this manner at a point to the right or left of the hub, or both, prevents any possible spreading of the wheels even when the freight car carrying the automobile is severely bumped and jolted.

The third leg 29 of the tripod, in the embodiment of the invention here illustrated, is preferably welded, riveted or otherwise secured to a plate 28 riveted to flanges 16, and is preferably formed as shown in Fig. 1, having an upwardly extending strengthening flange 30 along each side, and a horizontally extending foot 31 provided with a plurality of spaced apart nail holes, through a number of which are driven the double head nails or screws which secure the leg 29 to the floor.

The upwardly extending side flanges 30 form a substantially vertically extending channel, and, in addition to strengthening the leg 29, also perform the function of holding against longitudinal movement the hub receiving member hereinafter described.

Means are provided by the invention for supporting an automobile at the hubs of its wheels, where it is particularly desired to raise the tires off the floor, in order to avoid cutting of the tire by the rim in case the tire becomes flat, or to avoid defacement and damage to the tire by floor or other splinters; and in accordance with the invention this same means may be used to support merely a part of the weight of the automobile, with the tires bearing on the floor and supporting the remainder of the weight, where it is particularly desired to utilize, or partially to utilize, pneumatic or other tires as additional shock absorbing means. Also, in accordance with the invention, the same means above referred to may be used, when desired, merely as a wheel bracing and securing member, without supporting any of the weight of the automobile, the entire weight thereof in such case being borne by the tires.

In the form of the invention herein illustrated by way of example, said means is shown as comprising three members, namely, a false hub cap 40, a false hub cap securing member 50, and an elevating and shock absorbing member 60.

The false hub cap 40 has a threaded opening 41, by which it is screwed on the threaded wheel hub after removal of the regular hub cap, and also has a base 42 channeled on its under side to fit upon the securing member 50. The base 42 of the false hub cap 40 is notched, as at 44, to receive the shank of the bolt 45 which secures the false hub cap 40 to the securing member 50. The channeled base 42 prevents movement of the false hub cap 40 longitudinallly, or in the direction of the length of the automobile, with respect to the securing member 50, but permits transverse movement between these parts in the direction of the channel, thereby providing for lateral adjustment of the false hub cap on the buck to the proper position in which it is secured by the bolt 45, washer 47 and nut 48.

The bolt 45 extends upwardly through an opening 51 in securing member 50, herein shown as being in the form of an angle iron, the horizontal arm 52 of which cooperates with the channeled bottom of the false hub cap 40 to guide said hub cap for lateral adjustment and at the same time to prevent it from moving longitudinally. The vertical arm 53 of said securing member fits between and cooperates with the spaced side flanges 30 of the leg 29 of the buck to guide the false hub cap during its vertical movement, at the same time preventing it from moving longitudinally. The bolt 45 may be one having a square or hexagonal head, fitting into a similarly shaped depression in the under side of the horizontal arm 52, to prevent said bolt from turning when the nut 48 is turned home to clamp the false hub cap 40 to its securing member 50; or the bolt 45 may be welded in the opening 51 for this purpose. A nail hole 54 is preferably provided in the horizontal arm 52 for a purpose which will presently appear.

The vertical arm 53 of the securing member 50 is preferably slotted as shown at 55, and through this slot projects the shank of a bolt 56, provided with a square or hexagonal head, one face of which bears against the flange 16 or under side of the horizontal top 13 to prevent said bolt from turning when the nut 57 is tightened on it to hold the securing member in its finally adjusted position against movement transversely of the length of the automobile. It will be remembered that movement of the securing member longitudinally of the length of the automobile is prevented by the side flanges 30 of leg 29.

The invention provides means for raising the false hub cap above the horizontal top 13 of the brace to any desired height, depending upon the over all diameter of the automobile wheel, and upon how much of the weight of the automobile is desired to be carried by the brace or buck. The invention also provides means for securing the hub cap raising means in position, and for assembling it and removing it by a single movement.

In the present embodiment of the invention, this hub cap raising and lowering means is shown in the form of a block of wood 60, which may be hard where shock absorbing qualities will not be required of it, or soft where it is desired that the brace or buck, when used as a support, should be provided with additional yielding or shock absorbing means. As here shown, the block 60 has parallel upper and lower faces, but is preferably tapered or beveled at one end, as at 61, to permit it to be more readily put into position between the top 13 of the brace and the under side of the horizontal arm 52 as hereinafter described. It will now be obvious that the thickness of the block 60 to be used with any particular shipment is dependent entirely upon how far it is desired to lift the automobile off the floor, or upon how much of its weight is to be taken off the tires. When in position, the block 60 is held against movement in any direction by a double head nail driven into it through slot 44 in the base 42 of the false hub cap 40 and through the nail hole 54 in the horizontal arm 52 of the securing member, and one in each side of false hub cap 40 into block 60.

In loading an automobile in a freight car and securing it therein by means of the present invention, the regular hub cap of each wheel is removed and placed in the automobile, and the false hub cap 40 applied, unless, as is preferable, the regular hub caps have never been applied, but the false hub caps 40 have been put on in the assembling room, so that when the automobile arrives on the loading dock the false hub caps 40 are already on the hubs. The automobile is then placed in position in the freight car, and the remainder of the loading device of the present invention is brought up to each wheel. The false hub caps 40 are rotated to right or left to bring them to the position of Fig. 1, the amount of turning required being, in any case, less than one complete turn. With the nut 57 loose and the nut 48 off, the arm 52 of angle iron 50 on the brace is slid into position and secured by bolt 45 and nut 48 in the channeled bottom 42 of the false hub cap 40.

The block 60, beveled end first, may then, by two or three sharp blows of a hammer, be driven into position between the under side of arm 52 and the top 13, and there held by a nail driven into it through nail hole 54 in the arm 52 and one on each side of false hub cap 40 into block 60. If desired, however, the automobile may be jacked up, the blocks placed in position, and the automobile may then be lowered so that its weight is carried on the blocks, thus eliminating the necessity of driving the blocks into place, and permitting the use in this manner of rubber as well as wooden blocks. The buck may now be fastened down by the double head nails or screws shown in Fig. 1, and there are enough nail or screw holes in the feet 14 of the legs to insure that a sufficient number of holding nails or screws can be driven, unless the floor is wholly unserviceable.

If the automobile wheel is off the floor, it may be rotated, if necessary, to bring a rim bolt into position where the bracing arm 21 may be fixed to it, and, as above stated, it may not in all cases be desired to use both of the arms 21.

If the automobile is not off the floor, it may be momentarily jacked up, if necessary, to rotate the wheel to bring a rim bolt into position to secure it to the arm 21, and in such case, owing to the lack of working space in the freight car, it has been found feasible and efficient to place a jack under the top 13 of the loading buck, which in this case is not fastened down until this operation is completed.

It may also be mentioned that it has been found in practice that the application of a small amount of grease to the top and bottom of the block 60 facilitates the step of positioning it in the buck, and also its removal when the automobile is unloaded at its destination.

In unloading the automobile, the rim bolt arm or arms 21 are detached from the wheel, and the nut 57 is loosened. The nail holding block 60 is removed and the projecting end of block 60 (see Fig. 1) is grasped by hand and removed by two or three sharp pulls in a direction away from the wheel. If the automobile is not already resting on the floor, this allows it to drop to the floor and rest on its tires. The double head nails holding the brace to the floor are now removed, nut 48 is loosened and the buck is removed from proximity to the wheel, being moved away in the direction of the leg 29. The false hub caps 40 are replaced by the regular hub caps, after which the false hub caps are slid into position again on arm 52. When the nuts 48 and 57 and bolt or bolts 19 are tightened, the buck is ready to be returned to the shipper to be used again. It may be mentioned that the nuts 48 and 57, and nuts on bolts 19 can be identical in size and shape, so that they may all be removed or loosened conveniently by a single socket wrench.

It will be seen that by the foregoing construction there is provided a loading buck which may be used optionally to brace an automobile and support all or a part of its weight; or may be used purely as a brace, without supporting any of the weight of the automobile; also, that the height of the automobile off the floor is optional with the shipper; also, that a buck has been provided which, by lateral bracing, prevents any possible spreading of the automobile wheels under shipping shocks and jars, which may hold the automobile more or less yieldingly, depending on the material selected for block 60, which may be wood, rubber or any other suitable material; which can be used repeatedly and applied and removed efficiently and in a minimum of time; which prevents the tires from being defaced by wooden splinters, and prevents the rubbing of varnish form the hub band or between the spokes of a wheel such as is caused by various materials including rope or burlap ties that pass over the hub band or between the spokes in some loading methods; which, when removed, leaves no nails projecting from the freight car floor; which can be securely nailed in the desired position in spite of car floor cracks or defective flooring; and which can be used for floor loading, half decking or for double or full decking; and which has other features and advantages that will readily be apparent.

Various changes may be made in the height, material, proportions of parts and in other respects, which continued use of the invention may indicate to be desirable, without departing from the invention as defined by the following claims.

What is claimed is:

1. A vehicle loading device including, in combination, a member having means for attachment to a vehicle wheel hub, a support for said member, said member being vertically movable with respect to said support, and means for spacing said member from said support.

2. A vehicle loading device including, in combination, a member having means for attachment to a vehicle wheel hub, a support for said member, said member being vertically slidable with respect to said support, and removable means for spacing said member from said support.

3. A vehicle loading device including, in combination, a member having means for attachment to a vehicle wheel hub, a support for said member, said member being vertically movable with respect to said support, means for guiding said member in its vertical movement, and slidably removable shock absorbing means for spacing said member from said support.

4. A vehicle loading device including, in combination, a member having means for attachment to a vehicle wheel hub, a support for said member, said member being vertically movable with respect to said support, means preventing said member from turning with respect to said support, and yielding means for spacing said member from said support.

5. A vehicle loading device for supporting a vehicle off the floor including, in combination, a member having means for attachment to a vehicle wheel hub, a support for said member, said member being vertically movable with respect to said support, releasable means for securing said member to said support, and quickly removable means for spacing said member from said support, the removal of said means causing said member when released to drop downwardly.

6. A vehicle loading device including, in combination, a member having means for attachment to a vehicle wheel hub, a support for said member, guide means permitting said member to be moved vertically with respect to said support and preventing its turning with respect thereto, quickly removable means for spacing said member from said support, the removal of said means causing said member to drop downwardly, and means preventing accidental displacement of said removable means.

7. A vehicle loading device including, in combination, a member having means for attachment to a vehicle wheel hub, means preventing angular displacement of said member, a support for said member provided with variably positionable means for bracing a vehicle wheel at a point radially spaced from its hub, and means for spacing said member from said support.

8. A vehicle loading device including, in combination, a member having means for attachment to a vehicle wheel hub, a support for said member, said member being vertically slidable on said support and means permitting said member to be fixed with respect to said support at different heights therefrom.

9. A vehicle loading device including, in combination, a member having means for attachment to a vehicle wheel hub, a support for said member having means for receiving said member for vertical sliding movement, means for fixing said member with respect to said support, and spacing means between said member and said support.

10. A vehicle loading device including a body portion provided with floor securing means, vehicle wheel hub securing means and rim bolt attachable wheel bracing means associated therewith, and a shock absorbing filler member between said hub securing means and said body portion.

11. A vehicle loading device for supporting a vehicle off the floor, including a member having means for receiving a vehicle wheel hub, a support for said member, and a spacing element between said member and said support removable from its position therebetween while said loading device supports a vehicle.

12. A vehicle loading device for supporting a vehicle off the floor, including a member having means for receiving a vehicle wheel hub, a support for said member, and a block between said member and said support removable from its position therebetween while said loading device supports a vehicle.

13. A vehicle loading device for supporting a vehicle off the floor, including a vertically slidable member having means for receiving a vehicle wheel hub, a support for said member, and a block between said member and said support removable from its position therebetween while said loading device supports a vehicle.

14. A vehicle loading device including, in combination, an appliance having means for attachment to a portion of a vehicle, a support for said appliance, and a spacing member between said appliance and said support and removable from its position therebetween while said loading device supports a vehicle.

In testimony whereof I affix my signature.

JOHN FRANK REBUCK.